(12) United States Patent
Fletcher

(10) Patent No.: US 8,080,977 B1
(45) Date of Patent: Dec. 20, 2011

(54) POWER MONITOR

(76) Inventor: John W. Fletcher, Plainfield, CT (US)

( * ) Notice: Subject to any disclaimer, the term of this patent is extended or adjusted under 35 U.S.C. 154(b) by 795 days.

(21) Appl. No.: 12/228,726

(22) Filed: Aug. 16, 2008

Related U.S. Application Data

(60) Provisional application No. 60/965,211, filed on Aug. 17, 2007.

(51) Int. Cl.
H01M 10/44 (2006.01)
H01M 10/46 (2006.01)

(52) U.S. Cl. ........................................ 320/127

(58) Field of Classification Search .................. 320/107, 320/114, 115, 127, 132, DIG. 21; 377/16, 377/32; 340/635, 636.1
See application file for complete search history.

(56) References Cited

U.S. PATENT DOCUMENTS

| 4,973,901 | A | * | 11/1990 | Balch | 324/116 |
| 5,568,398 | A | * | 10/1996 | Trainor | 700/298 |
| 6,445,163 | B1 | * | 9/2002 | Chenier et al. | 320/133 |
| 2006/0232139 | A1 | * | 10/2006 | Mullin | 307/116 |

* cited by examiner

Primary Examiner — Edward Tso
(74) Attorney, Agent, or Firm — Emery L. Tracy

(57) ABSTRACT

A power monitor for indicating that a power outage has occurred is provided. The power monitor comprises an outer casing with a pair of electrical prongs extending from the outer casing. An AC relay is mounted within the outer casing and electrically connected to the prongs with the AC relay disconnecting when power is lost. A DC relay is mounted within the outer casing and electrically connected to the AC relay with the DC relay energized upon disconnection of the AC relay. A timer clock is mounted within the outer housing with the timer clock activated upon activation of the DC relay. A display screen is mounted on the outer casing for visually displaying the amount of time generated by the timer clock.

20 Claims, 2 Drawing Sheets

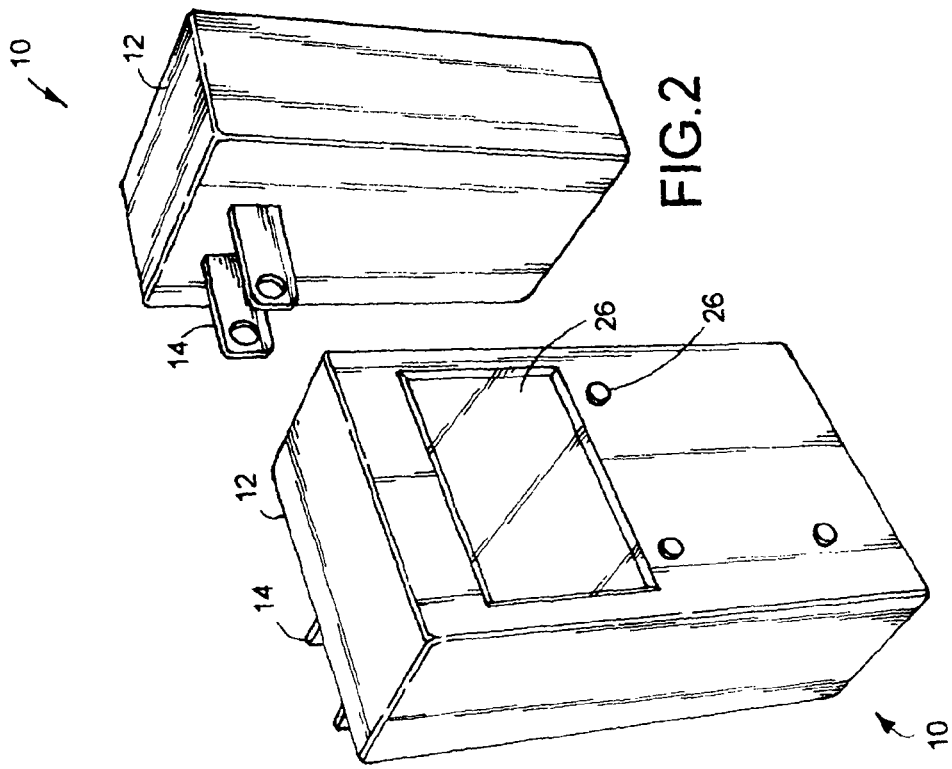
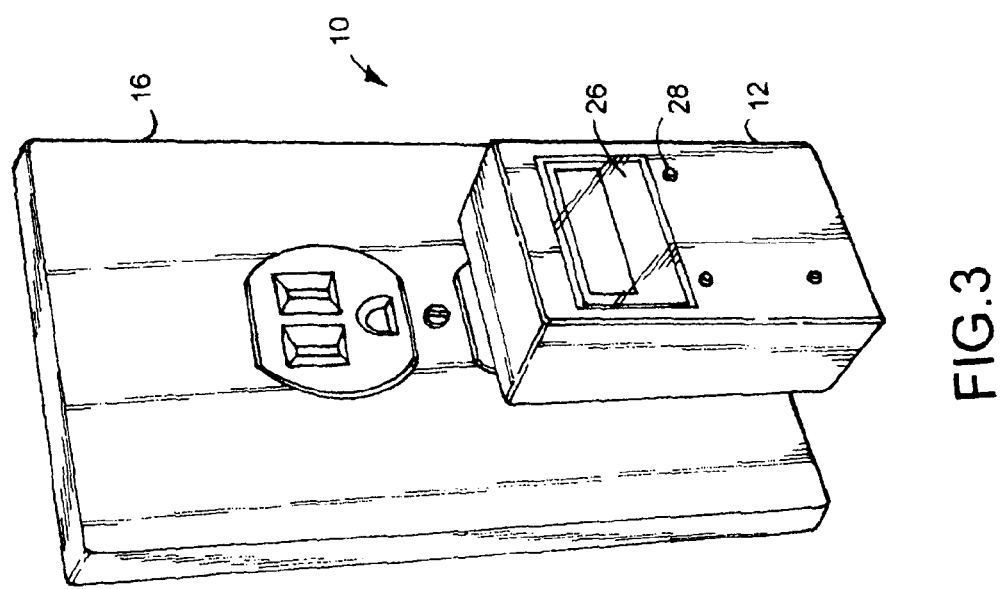

POWER MONITOR

The present application claims priority of pending provisional patent application Ser. No. 60/965,211, filed on Aug. 17, 2007, entitled "Power Monitor".

BACKGROUND OF THE INVENTION

1. Field of the Invention

This invention relates generally to a power monitor and, more particularly, the invention relates to a power monitor for determining if an appliance has lost power and conveys the amount of time the power has been off.

2. Description of the Prior Art

Perhaps no modern convenience is depended upon more, all over the world, than electricity. Providing light by which to see, offering air conditioning and heating to battle the elements, and powering the computer equipment that virtually keeps today's world running smoothly, electricity might be said to be as essential as food, clothing, and shelter. In fact, because electricity has allowed for unparalleled advances in technology and medicine, people are living longer than ever before.

While electrical power has only been around for a century, households today would be hard pressed to imagine living without it. From powering the water supply and giving heat to water for a relaxing bath to enabling televisions and allowing food to be frozen for prolonged freshness, electricity is one of the fundamental facets of comfortable daily living.

While the convenience of electrical power could never be disputed, the world's dependence on it does give way to a drawback. Particularly, few things are more inconvenient than a power outage. A common occurrence, power outages can be caused by a wide variety of factors. Colder climates that face brutal winter storms are much more susceptible to frequent power Outages, as heavy snows and massive accumulations of ice weigh down and even break power lines. As a result, people in these areas are often forced to go for days without electricity as they wait for the thaw that will allow lines to be repaired. Whether it is a localized situation where a car hits a utility pole causing an outage to twenty homes or a huge thunderstorm that knocks out power to thousands of customers in a widespread region, even a short term loss of electricity can be uncomfortable and frustrating. In addition to ceasing operation of much-needed air conditioning or heating units, power outages can also result in the defrosting and spoiling of frozen and refrigerated foods. Depending on freezers to keep food supplies fresh until prepared, consumers typically fill these handy units to ensure there is always enough food on hand. Should frozen foods begin to thaw as a result of a power outage, people usually have time to refreeze these items before they spoil. However, if a loss of electricity has occurred while out of the house for an extended time, such as during a vacation, consumers have no way of knowing if food has thawed and refrozen while they were gone. Unfortunately, this could possibly result in the preparation of rancid meats and other spoiled perishables.

SUMMARY

The present invention is a power monitor for indicating that a power outage has occurred. The power monitor comprises an outer casing with a pair of electrical prongs extending from the outer casing. An AC relay is mounted within the outer casing and electrically connected to the prongs with the AC relay disconnecting when power is lost. A DC relay is mounted within the outer casing and electrically connected to the AC relay with the DC relay energized upon disconnection of the AC relay. A timer clock is mounted within the outer housing with the timer clock activated upon activation of the DC relay. A display screen is mounted on the outer casing for visually displaying the amount of time generated by the timer clock.

The present invention further includes a method for indicating that a power outage has occurred. The method comprises providing an outer casing, extending a pair of electrical prongs from the outer casing, providing an AC relay within the outer casing, electrically connecting the AC relay to the prongs, disconnecting the AC relay when power is lost, providing a DC relay within the outer casing, electrically connecting the DC relay to the AC relay, energizing the DC relay upon disconnection of power to the AC relay, mounting a timer clock within the outer housing, activating the timer clock upon activation of the DC relay, mounting a display screen to the outer housing, and visually displaying on the display screen the amount of time generated by the timer clock.

BRIEF DESCRIPTION OF THE DRAWINGS

FIG. 1 is a front perspective view illustrating a power monitor, constructed in accordance with the present invention;

FIG. 2 is a rear perspective view illustrating the power monitor, constructed in accordance with the present invention;

FIG. 3 is a perspective view illustrating the power monitor, constructed in accordance with the present invention, with the power monitor plugged into an outlet.

DETAILED DESCRIPTION OF THE PREFERRED EMBODIMENTS

Figure 4:
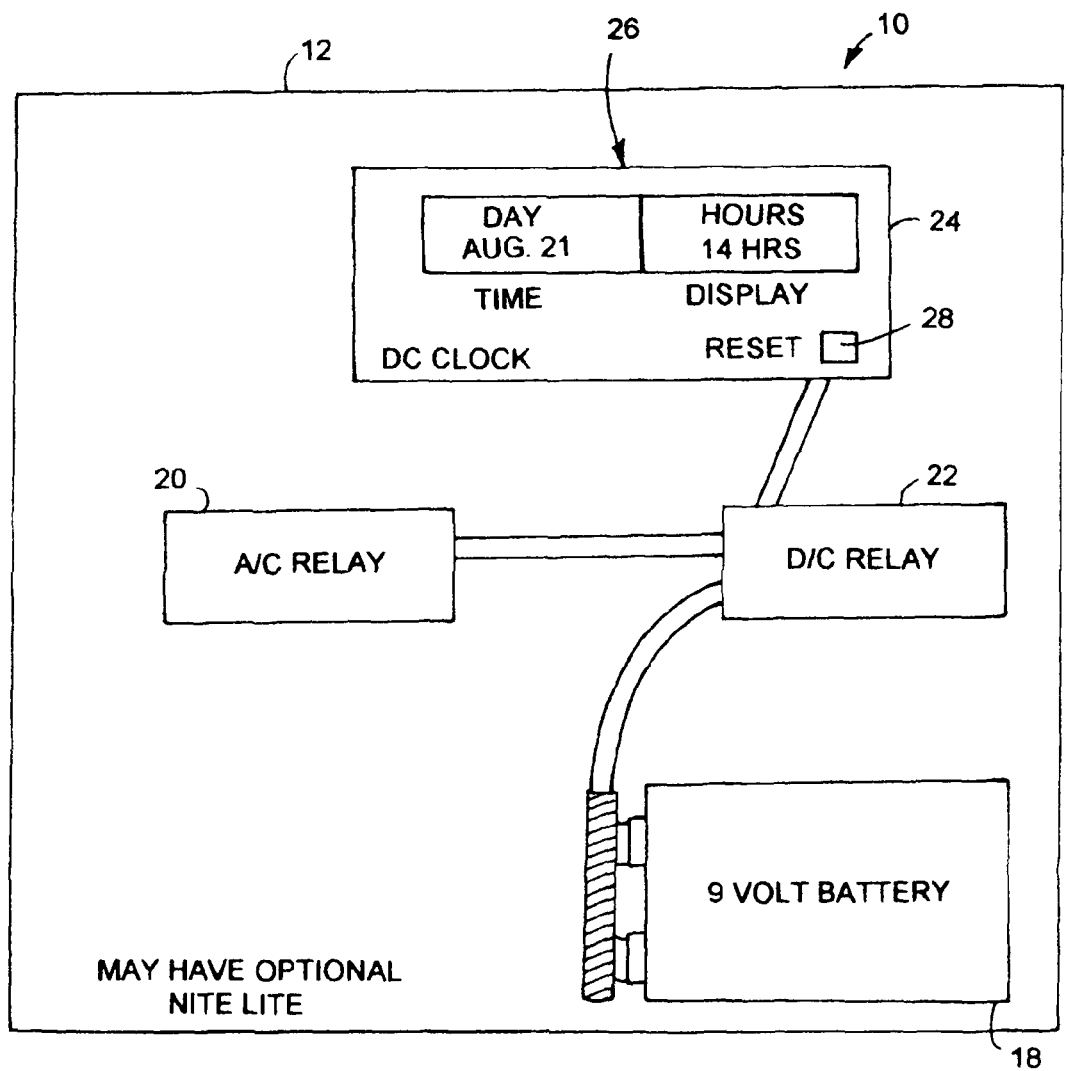
FIG. 4 is a schematic view illustrating the power monitor, constructed in accordance with the present invention.

As illustrated in FIGS. 1-4, the present invention is a power monitor, indicated generally at 10, for indicating that a power outage has occurred while away from home or other property such as a boat, trailer, motor home, vacation home, etc. Simply stated, the power monitor 10 of the present invention is a specially designed gauge that determines if an appliance, such as a refrigerator or freezer, has lost power, and conveys the amount of time the power has been off.

The power monitor 10 of the present invention has an outer casing 12 with two electrical prongs 14 extending from the outer casing 12. The electrical prongs 12 are sized and shaped to be received in a standard electrical outlet 16. In another embodiment, the power monitor 10 can be wired into an appliance's electrical system. The power monitor 10 runs on an independent circuit in addition to a battery 18 for power. The power monitor 10 includes an AC relay 20 that disconnects when power is lost. The disconnecting of the AC relay 20 energizes a DC relay 22 that starts the timer clock 24. In this manner, in the event of an outage, the DC circuit 22 in the power monitor 10 engages, and the internal timer 24 begins to track the amount of time power is out. The battery 18 such as a nine-volt battery preferably powers the DC relay 22. An optional night light can be incorporated in the power monitor 10.

The power monitor 10 of the present invention further has an LCD or other type of display screen 26 for visually displaying the amount of time generated by the timer clock 24 when the power was turned off. In other words, once the timer clock 24 begins with the loss of power, the LCD display screen 26 informs the user that the power has been lost and displays the date and amount of time the power has been lost.

Upon returning home, a user checks the display screen 26 of the power monitor 10 for an indication that a power outage has occurred while away. If there has been a loss of electricity, the LCD display screen 26 conveys the amount of time that power was lost. Alerted that the food has most likely spoiled, the user can then properly dispose of these items. A reset button 28 on the power monitor 10 allows the user to reset the timer clock 24.

It should be noted that the power monitor 10 of the present invention can be powered by 110 volt and 220 volt power depending on the needs and desires of the user. Furthermore, the power monitor 10 can be set up with software or the like to call or otherwise notify a user via cell phone or computer if the power goes out. In this manner, the user is alerted prior to returning to the property that there has been a power outage and to be prepared to take appropriate action.

There are many significant benefits and advantages associated with the power monitor 10 of the present invention. Foremost, the power monitor 10 is an electronic, battery-operated apparatus configured with an internal timer 24 and liquid crystal display (LCD) screen 26 able to alert a user that frozen and refrigerated foods may have defrosted as a result of a power outage. Allowing vacationers to know that a loss of electricity has occurred while they were away, the power monitor 10 warns that food items may have spoiled prior to the return of power. In this manner, consumers will avoid preparing tainted foods that could possibly result in food poisoning or other serious illnesses. The ease of use along with the power monitor's 10 installation in appliances at point of manufacture provides a very beneficial home accessory for users who live in areas with frequent power outages, particularly in colder climates where snow and ice storms are quite common. While the power monitor was primarily conceived with household users in mind, restaurants and other establishments where food is prepared or sold will find the power monitor an invaluable tool to help them serve the best quality food at all times. Very importantly, the power monitor will prove particularly invaluable to owners of RV's and residential boats, ensuring that any food items stored in these mobile dwellings will be safe to eat once the owners return.

The power monitor 10 of the present invention alerts consumers that their frozen food supply may have defrosted while they were away from home. A visual indication that there has been a power outage, users will immediately know that it is necessary to dispose of possibly spoiled and rotten foods.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A power monitor for indicating that a power outage has occurred, the power monitor comprising:
    an outer casing;
    a pair of electrical prongs extending from the outer casing;
    an AC relay within the outer casing and electrically connected to the prongs, the AC relay disconnecting when power is lost;
    a DC relay within the outer casing and electrically connected to the AC relay, the DC relay energized upon disconnection of the AC relay;
    a timer clock within the outer housing, the timer clock activated upon activation of the DC relay; and
    a display screen mounted on the outer casing for visually displaying the amount of time generated by the timer clock.

2. The power monitor of claim 1 wherein prongs are sized and shaped to be received in a standard electrical outlet.

3. The power monitor of claim 1 wherein the power monitor is wired into an appliance's electrical system.

4. The power monitor of claim 1 wherein the DC relay is powered by a battery.

5. The power monitor of claim 4 wherein the battery is a nine-volt battery.

6. The power monitor of claim 1 and further comprising:
    a night light.

7. The power monitor of claim 1 wherein the display screen is an LCD screen.

8. The power monitor of claim 1 wherein the display screen displays the date and amount of time the power has been lost.

9. The power monitor of claim 1 and further comprising:
    a reset button for resetting the timer clock.

10. The power monitor of claim 1 wherein the AC relay is powered by 110 volt or 220 volt power.

11. The power monitor of claim 1 wherein the power monitor has software for notifying a desired person via cell phone or computer if power is lost to the AC relay.

12. A method for indicating that a power outage has occurred, the method comprising:
    providing an outer casing;
    extending a pair of electrical prongs from the outer casing;
    providing an AC relay within the outer casing;
    electrically connecting the AC relay to the prongs;
    disconnecting the AC relay when power is lost;
    providing a DC relay within the outer casing;
    electrically connecting the DC relay to the AC relay;
    energizing the DC relay upon disconnection of power to the AC relay;
    mounting a timer clock within the outer housing;
    activating the timer clock upon activation of the DC relay;
    mounting a display screen to the outer housing; and
    visually displaying on the display screen the amount of time generated by the timer clock.

13. The method of claim 12 and further comprising:
    wiring the power monitor into an appliance's electrical system.

14. The method of claim 12 and further comprising:
    powering the DC relay by a battery.

15. The method of claim 12 and further comprising:
    displaying the date and amount of time the power has been lost.

16. The method of claim 12 and further comprising:
    resetting the timer clock.

17. The method of claim 12 and further comprising:
    notifying a desired person via cell phone or computer if power is lost to the AC relay.

18. A power monitor for indicating that a power outage has occurred, the power monitor comprising:
    an outer casing;
    electrical means for providing power to a point within the outer casing;

an AC relay within the outer casing and electrically connected to the electrical means, the AC relay disconnecting when power is lost;

a DC relay within the outer casing and electrically connected to the AC relay, the DC relay energized upon disconnection of the AC relay;

a timer clock within the outer housing, the timer clock activated upon activation of the DC relay;

a display screen mounted on the outer casing for visually displaying the amount of time generated by the timer clock, the display screen displaying the date and amount of time the power has been lost; and a reset button for resetting the timer clock.

19. The power monitor of claim 18 wherein the electrical means are a pair of prongs are sized and shaped to be received in a standard electrical outlet.

20. The power monitor of claim 18 wherein the power monitor has software for notifying a desired person via cell phone or computer if power is lost to the AC relay.

* * * * *